INVENTOR.
ROBERT T. SHIELS Jr.
BY
HIS AGENT

Jan. 24, 1967  R. T. SHIELS, JR  3,300,714
METHOD OF REELING COMMUNICATION CABLES TO IDENTIFY DEFECTIVE
PAIRS INCLUDING GROUNDING THE IDENTIFIED DEFECTIVE PAIRS
Filed Oct. 7, 1963  3 Sheets-Sheet 2

INVENTOR.
ROBERT T. SHIELS Jr.
BY
V F Voek
HIS AGENT

United States Patent Office 3,300,714
Patented Jan. 24, 1967

3,300,714
METHOD OF REELING COMMUNICATION CABLES TO IDENTIFY DEFECTIVE PAIRS INCLUDING GROUNDING THE IDENTIFIED DEFECTIVE PAIRS
Robert T. Shiels, Jr., Darien, Conn., assignor, by mesne assignments, to Anaconda Wire and Cable Company, a corporation of Delaware
Filed Oct. 7, 1963, Ser. No. 314,401
14 Claims. (Cl. 324—52)

My invention relates to a method of reeling communication cables with segregated defective pairs and particularly to a method for cutting such cables and locating the defective pairs in the cut ends.

In the manufacture of communication cables such, for instance, as paper-insulated telephone cables, to which, however, I do not wish my invention to be limited, the conductor pairs must be tested after the cable has been completed and reeled. If one or more of the pairs in the cable is found to be defective in this test industry standards may permit the cable to be shipped with the defective pair so long as the pair is marked or identified and the nature of the defect indicated. For example, in cables made up of size AWG 24 wires, one defective pair is permitted in cables of 51 to 303 pairs, two defective pairs are permitted in cables of 404-606 pairs, and three defective pairs are permitted in cables of 909 pairs and larger. In addition a somewhat larger number of pairs having a lesser defect classed as a manufacturing deviation are permitted by industry-wide agreement. In this application I will use the words "defective pair" to include a pair having only a "manufacturing defect."

The defective pairs are identified at both ends of the cable by plastic sleeves that are slipped over them and pushed down about a foot from the ends. The sleeves are color coded according to the nature of the defect in the offending pair. The cables for which the above-mentioned industry standards have been adopted may be sheathed in lead, or aluminum, or they may have a conducting tape wrapped around the pairs and covered by a plastic sheath. In any case the insulated pairs have an overall metal or other electrically conducting covering that provides shielding from external electrical fields and the word "shield" as used in my application refers to such a metallic or electrically conducting covering.

In the conventional manufacture of telephone cables the cables are wound on shipping reels in such a manner that the end of the cable closest to the hub of the reel, which I shall call the leading end, is left accessible for testing and capping. By capping I refer to an end closure that is used to seal the cable within its sheath during storage and shipping. In the case of paper-insulated-conductor cables such sealing is necessary to exclude moisture, which would otherwise be absorbed from the atmosphere by the paper and result in a reduction of the insulation resistance of the insulation and a change in capacitance. Further protection against moisture may be provided by introducing dry, pressurized gas into the capped cable. This is usually done through nozzles that penetrate the end caps.

The accepted methods so far described are generally satisfactory where full reel-lengths of cable are to be installed, but when it is found necessary to cut a short length of cable from a full reel these methods are unsatisfactory for the following reasons. Let us say that a cable with a defective pair has been stored on a reel and it is desired to cut a short length from the stored reel to ship to an installation site. The defective pair will have been marked by coded plastic sleeves at both the leading and trailing ends of the cable, the ends will have been capped, and a short length, possibly 18 inches, of the leading end of the cable will have been left protruding through the flange or drum of the reel. From this stored cable the desired length is wound onto another reel with the trailing end of the original cable becoming the leading end of the rewound length. This end is left accessible on the new reel by allowing it to protrude through a flange or drum in the known manner. The cable is cut at a point between the two reels and it is now necessary to locate the defective pair in each of the cut lengths. This can be done by removing the caps and about 12 inches of sheath, finding the colored sleeves and belling out the pairs at the cut ends against the pair identified by the sleeve. "Belling" is the term used by telephone technologists for the method of testing the continuity of a conductor by placing it in a series circuit with a bell or buzzer which indicates by audible signal when the circuit is closed. However, even when a visual, rather than audible, signal is used, the term "belling" is commonly retained and in this application "belling" refers to any method of testing the continuity of an electrical conductor. When the unmarked end of the defective pair is found, sleeves are applied to that end and the exposed cable is trimmed and capped. To locate the colored sleeve originally applied, however, it has been necessary, as stated, to cut off a length of sheath, and to fan out the pairs, because the sleeves are buried about a foot into the cable. This burial of the sleeves deep into the cable is a universal practice and is dictated by the need to have the sleeve intact if a short section is cut from the end of the cable. The trimming mentioned above consists of cutting off and discarding the fanned out pairs so that caps can again be applied to the sheath. On the original reel, there is not enough of the leading end available, because of the pair trimming, to apply a new cap and be able to test the pairs again if required. This length, then, has to be re-reeled, and if a large number of short lengths are cut from one reel of cable the large number of re-reelings will have a deleterious effect on the cable quality, particularly with regard to capacitance unbalance.

My new method eliminates the need to re-reel cables when short lengths are cut from them and, indeed, eliminates the need for removing the caps from the ends of a cable to locate the defective pairs when the cable is cut. In my method of reeling a multipair shielded telephone cable, including cables sheathed in conducting materials but free from other shielding, I apply the step of winding the cable onto a reel while maintaining the leading end accessible for testing and capping, and testing the individual pairs to locate the defective pair. I then ground at least one conductor of the defective pair to the cable shield, while maintaining the nondefective pairs insulated from the shield. When a short length of cable is needed I unreel the required amount and cut it off. I then bell the conductors of the cut lengths to the shield to locate the defective pair in both ends of the cut cable and ground at least one conductor of the defective pair in the cable remaining on the reel to the cable shield. By grounding the trailing end of the defective pair that is on the reel I am enabled to repeat the above operation if it is desired to cut off another short length. Of course, if the length of cable remaining on the reel is to be used immediately or if it is so short that no further lengths will be cut from it, I merely identify the trailing end of the faulty pair on the reel with a plastic sleeve. If the cut length on the original reel is to be stored, the cut end is sealed with a cap. The faulty pair on the cut length is, of course, also identified with a sleeve.

The above method will be seen to be adequate when there is only one defective pair or when all the defective pairs fall in the same category or fault. When there are two different types of faulty pair, I ground the tip conductor of one type to the cable shield and the ring conductor of the other type. Since the pairs are color-coded in accordance with industry practice of long standing, I can then learn the nature of the defect according to a prearranged code by identifying the pair in which the tip conductor is grounded as distinct from the pair in which the ring conductor is grounded.

When there are more than two types of defect, I have invented the method of introducing a resistor in series with the conductor when grounding it to the shield. A rough comparison of the resistance of the circuits with and without resistors can be made by known methods. Where a large number of different types of fault must be identified, resistors having different values of resistance can be inserted in the different circuits and each circuit identified by a resistance measurement when the cable is cut.

A more thorough understanding of my invention can be gained from a study of the appended drawing.

Figure 1A:
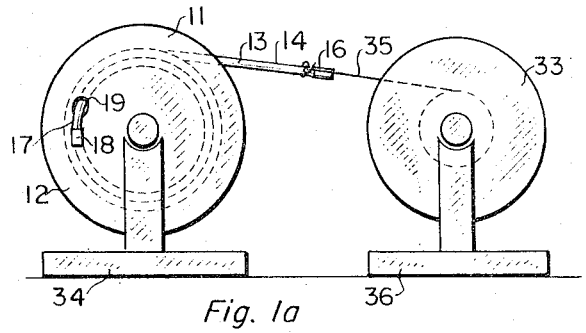
FIGURES 1a–1d are a diagrammatic representation of the method of my invention.

In FIGURE 1a a cable reel 11 with a flange 12 has a plurality of layers of a paper-insulated, steel-sheathed telephone cable 13 wound around it. My invention has particular application to paper-insulated cables because such cables are not completely color coded in commercial practice and it is necessary to bell out the pairs in order to identify both ends of any individual pair. Furthermore, paper-insulated cables are customarily accepted with one or more defective pairs where as this is not true of plastic cables. In cases where plastic cables are not fully color coded and are shipped with one or more defective pairs, my invention will have utility for them also.

Figure 3:
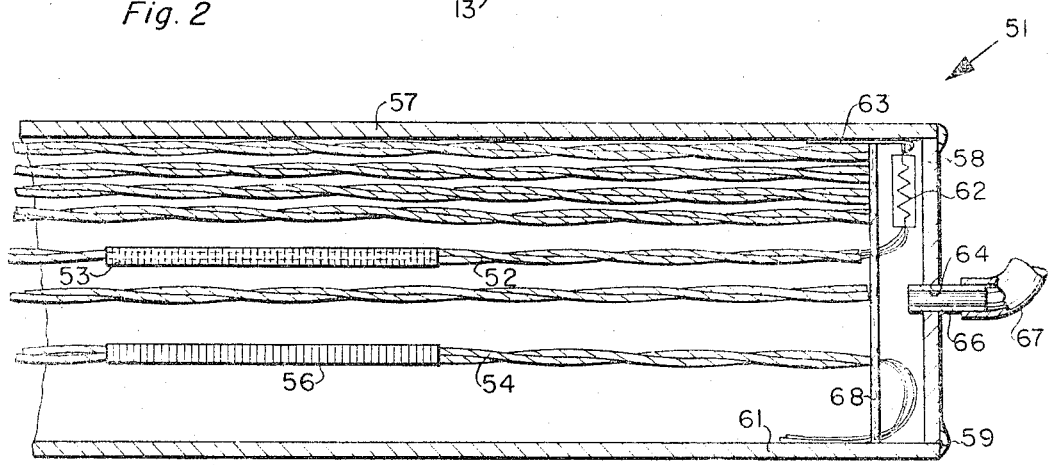
FIGURE 3 is a section of one end of a cable reeled in accordance with another embodiment of my invention.
Figure 4:
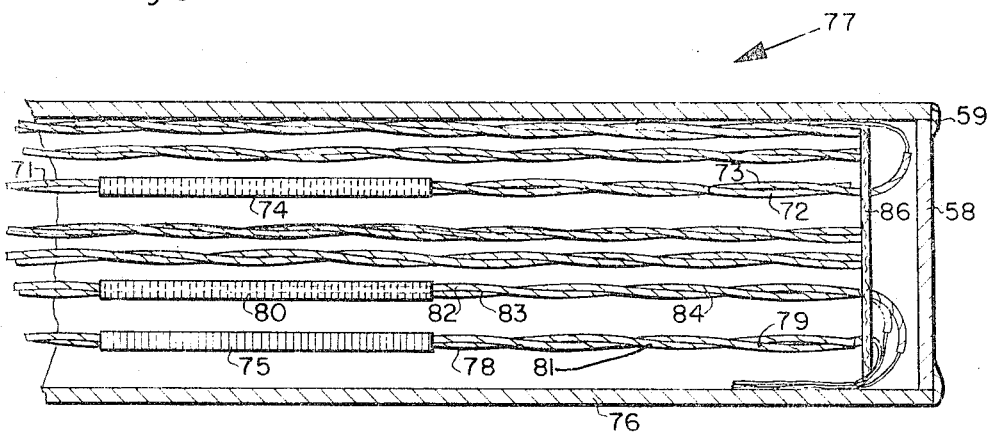
FIGURE 4 is a section of one end of a cable reeled in accordance with another embodiment of my invention.

The cable 13 has been capped on its trailing end 14 with a sealing cap 16, and on its leading end 17 with a cap 18. The leading end 17 has been passed through a slot 19 in the flange 12 so that it is accessible for testing. The exposed end 17 is usually protected by a steel cover that bolts onto the reel. This cover, which prevents injury to the cable-end in transit, has been removed in the drawing. As can better be seen in FIGURE 2 the cap 16 is crimped over a steel sheath 21 which covers, and is in electrical contact with, an aluminum or copper shield 26 over a plurality of conductor pairs 22. For the purposes of my invention, the steel sheath and aluminum or copper shield may be considered as a single element and they are not shown separately in FIGURES 1a–d. Although I have shown a steel-sheathed cable, my invention has equal application to other types of shielded cable such as lead-sheathed cables which are shown in FIGURES 3 and 4. The combined shield and sheath 21, 26, as will be shown, serves as a return path to complete the circuit with a defective pair but my invention would also be applicable in the absence of a shield if the cable included a grounding conductor, either internally or externally, to serve as this return path. A defective pair 23 has been identified by a colored sleeve 24. The pair 23 is longer than the nondefective pairs 22 and extends past the cable end so that it can be folded against the shield 26 in grounding contact therewith. It is a convenient matter, in practice, to make the faulty pair longer than the others, because to test the pairs originally, they were all left long when the sheath 21 was cut back, and fanned out for testing. In the practice of the known art the pairs are cut off more or less flush with the end of the sheath prior to capping. In my method, it is only required that the defective pairs be left long when the others are cut off. I have shown the cap 16 made of steel. This is crimped to the sheath 21 by a crimping tool in a known manner. The pair 23 is comprised of two paper-insulated conductors 27, 28, of which conductor 27 is a tip conductor normally with white insulation 29 and conductor 28 is a ring conductor with colored insulation 31. To ground the conductors to the sheath 21 the insulations 29, 31 have been stripped back to a point 32.

Figure 1B:
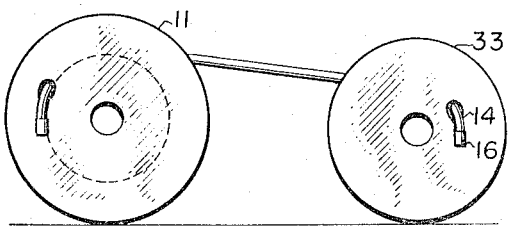
Figure 1C:
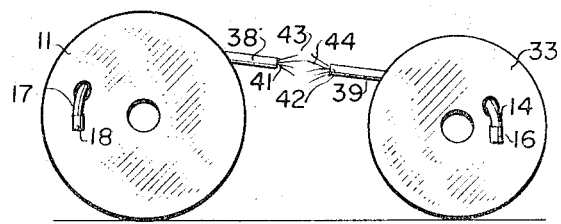
Figure 1D:
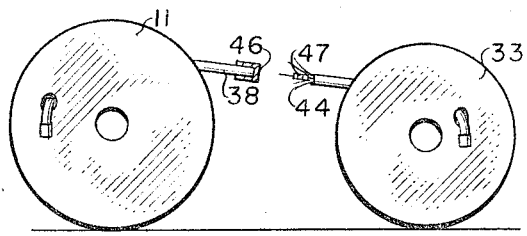

In FIGURE 1a a portion of the cable 13 is about to be reeled onto a reel 33. For this purpose the reels are mounted in strands 34, 36 and a lead rope 35 has been fastened to the end 14. In FIGURE 1b the required length of cable has been reeled onto the reel 33 and the cable is ready to be cut. In FIGURE 1c the cable has been cut leaving trailing cable ends 38 and 39. The sheath has been cut back to a point 41 of the end 38 and to a point 42 of the end 39 and the conductors have been fanned out at 43 and 44. The end 14, bearing the cap 16, has become the leading end of the length of cable on the reel 33. It is now desired to find the trailing end of the defective pair 23. In the prior art it would be necessary to cut off the caps 18 and 16, cut back the sheath of the ends 17 and 14, fan out the conductors to reach the sleeve 24 and then bell the conductors at 43, 44 against the pair 23 until the trailing end of the pair was located. Thereafter when the fanned out conductors of the end 17 were cut off and the end recapped, it would be too short and the end 38 would become the leading end for rereeling onto a different reel. In a paper-insulated cable, however, the repeated rereeling is harmful since, when the cable is flexed the conductors rub against each other and change their relative positions within the core. In my method the caps 18 and 16 are not removed at all and no rereeling is necessary. The fanned out ends 43 are belled against the shield 26 until a closed circuit has indicated the identity of the pair 23. Similarly the length of the defective pair in the cable on the reel 33 is found by belling the fanned out pairs 44 against the cable shield. Thereafter, sleeves similar to the sleeve 24 are slipped over the cut ends of the defective pair, the sleeves are pushed into the cable, the fanned-out conductors are cut off and new caps are applied over the cable ends. In FIGURE 1d a cap 46 has been applied to the end 38 after cutting off the fanned pairs 43 and a sleeve 47 has been applied to the defective pair on the reel 33. This sleeve will be pushed under the sheath prior to cutting off the fanned pairs 44. A similar sleeve, which does not appear in the drawing, has also, of course, been applied to the end 38 before capping. In cutting off the fanned pairs 43, 44 the defective pair may be left long, and grounded to the shield as in FIGURE 2. Whether or not this is done depends upon the likelihood that the cable will be cut again. In the case of the cable remaining on the reel 11 it will usually be advisable to ground the defective pair, while the length of cable on the reel 33, since it most probably would have been cut to the length required for immediate installation, will not have the defective pair grounded. It should further be noted that I have followed the accepted practice of marking the defective pair with a coded sleeve although such a practice may not appear to be necessary since the defective pair is identified by the fact that it is longer than the other pairs. It is, however, a common practice to remove the caps by sawing off the ends of the cable and in such a practice the identification would be lost if the defective pairs were not marked with a sleeve, inwardly of the cut-off point.

In FIGURE 3 I have shown an end, indicated generally by the numeral 51, of a lead-sheathed cable with two different types of defective pairs. One defective pair 52 bears a black sleeve 53 and another defective pair 54 bears a red sleeve 56. The cable has a shielding sheath 57 and a cap 58 that is wiped to the sheath with a solder wipe 59. The cap 58, as is common for lead-sheathed cables, is cut to fit within the walls of the sheath like a plug rather than being crimped over the outside of the sheath as is the case with steel-sheathed cables. The pair 54 is grounded to the sheath 57 at a point 61 and the pair 52 is series-connected to a resistor 62 that is grounded to the sheath 57 at a point 63. The resistance of the resistor 62 is high enough to be distinguished from any contact resistance and the two pairs can be readily distinguished by known means. No special equipment may be necessary, for in belling out the pairs a proper choice of resistor 62 will result in a more feeble signal for the circuit containing the pair 52 than that received from the circuit with the pair 54. Although I have shown only two defective pairs in the cable-ends 51 it will be readily understood that there may be any plurality of pairs with the type of defect of the pair 52 and any plurality with the type of defect of pair 54 and so long as all the type 52 pairs are grounded through a resistor and all the type 54 pairs are dead grounded to the shield, these pairs can be located and identified as to type of defect when the cable is cut, without requiring the removal of the cap 58. Furthermore, if the cable contains a defective pair of a type other than that of the pairs 52 and 54 an additional resistor having a resistance measurably different from the resistor 62 might be connected in series with that conductor and the shield.

The cap 58 is pierced with a hole 64 through which is sealed a nozzle 66 connected by means of a hose 67 to a gas supply not shown. To prevent the nondefective conductors from shorting to the nozzle 66 a pad 68 of insulating material, which may be paper, plastic or other dielectric material, is inserted against the ends of the cut pairs and pierced by the pairs 52, 54 passing to the shield. Although I have shown both conductors of the defective pairs grounded to the shield in each case, my method will have utility if only one of the conductors is grounded, and as shown in FIGURE 4, where there are three types of fault, these can be distinguished from each other without the addition of resistors by grounding the tip conductor of one type, the ring conductor of a second type and both conductors of the third type. A defective pair 71 having tip conductor 72 and ring conductor 73 and a coded sleeve 74 has the ring conductor 73 grounded to a shield 76 of a cable-end, indicated generally by the numeral 77. Another defective pair 78 having a different type of defect from that of the pair 71, as indicated by a coded sleeve 75, and having tip conductor 79 and ring conductor 81 has the tip conductor 79 grounded to the shield 76. A pair 82 has still a different type of defect from that of the pairs 71 and 78, as indicated by a coded sleeve 80. The pair 82 has conductors 83, 84, both of which are grounded to the shield 76. An insulating pad 86 is pierced only by those conductors 73, 79, 83, 84 of the defective pairs which it is desired to ground to the shield.

Figure 2:
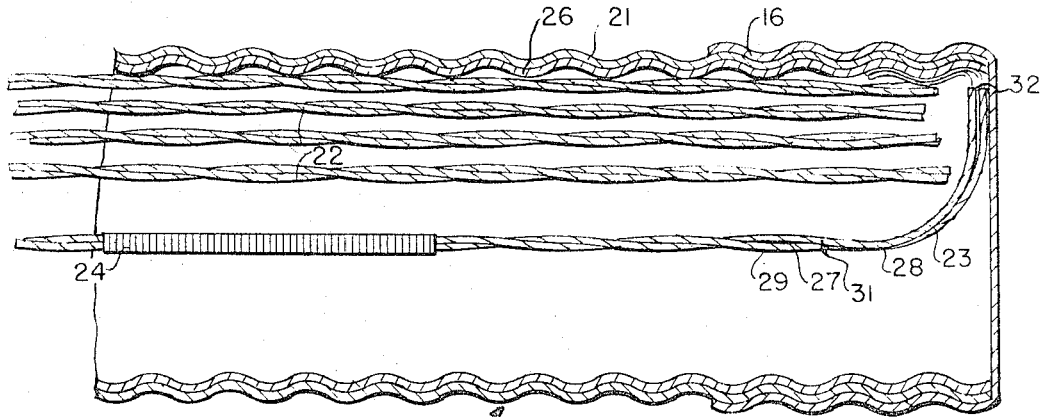
FIGURE 2 is a section of one end of a cable reeled in accordance with my invention.
Figure 5:
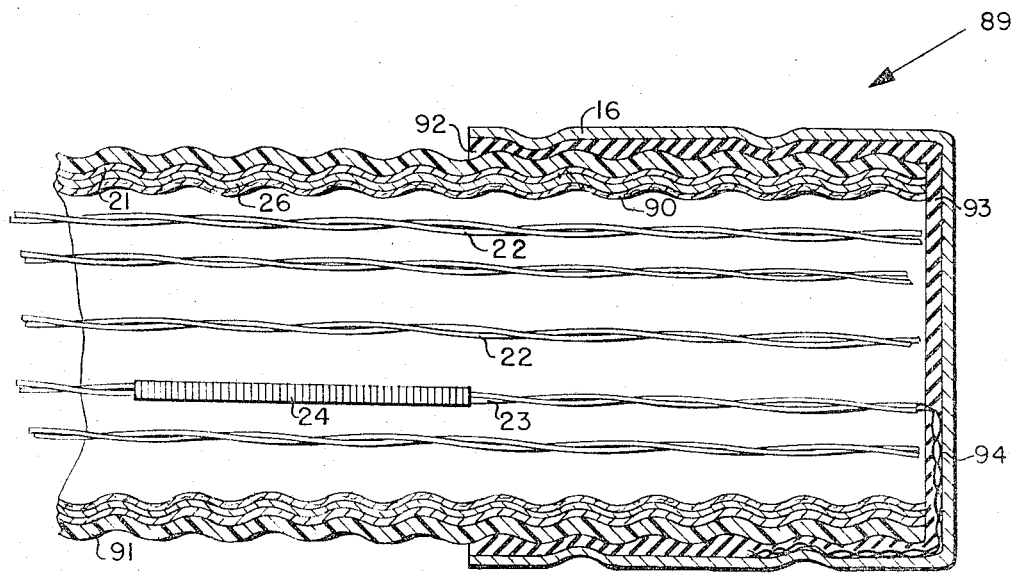
FIGURE 5 is a section of one end of a cable reeled in accordance with another embodiment of my invention.

When large cables are capped by crimping in the manner shown in FIGURE 2 the distortion of the cable sheath may, if the crimping is severe enough, cause the shield to make contact with the conductors of some of the nondefective pairs. This may occur at the ends of the conductors or by penetration through the conductor insulations. In FIGURE 5 I show an embodiment of my method wherein the cap is insulated from the shield and the defective pair or pairs is grounded to the cap but not to the shield. In FIGURE 5 a cable end, indicated generally by the numeral 89 is shown with a polyethylene jacket 91 over the steel sheath 26. This jacket is customary but has been omitted from the other figures for the sake of clarity. Another customary feature is a paper wrap 90 applied over the cabled pairs under the shield 26. When crimping of the cap 16 is severe not only may the shield 26 or sheath 21 make contact with the conductors of the pairs 22 in spite of the wrap 90 but the cap 16 may penetrate through the jacket 91 to the sheath 21. To isolate the defective pair 23 from the nondefective pairs 22 I therefore apply an additional electrical insulating layer 92 under the cap 16. The layer 92 is made of a tough material such as friction tape and is stretched over the end of the cable in the area 93 to prevent the edges of the shield 26 and sheath 21 from making contact with the cap 61. Conductors 94 of the defective pair 23 are, however, passed through the insulation 93 around the cable where they are crimped under the cap 16 in a firm electrical contact. In this case when the cable is cut and it is desired to locate the defective pairs at the cut end, the pairs are belled against the cap 16, rather than the shield, until the pair is found that has been grounded to the cap.

I have invented a new and useful method for which I desire an award of Letters Patent.

I claim:

1. The method of reeling a multipair, shielded communication cable having a leading and a trailing end and at least one defective pair, comprising the steps of:
   (A) winding said cable onto a reel while maintaining said leading end accessible for testing and capping,
   (B) testing the individual pairs of said cable thereby locating said defective pair,
   (C) grounding at least one conductor of said defective pair to the cable shield while maintaining the nondefective pairs insulated from said shield, and
   (D) capping said leading and trailing ends.

2. The method of reeling a multipair communication cable having a leading and a trailing end and at least one defective pair, comprising the steps of:
   (A) winding said cable onto a reel while maintaining said leading end accessible for testing and capping,
   (B) testing the individual pairs of said cable thereby locating said defective pair,
   (C) identifying said defective pair at said leading and trailing ends, and
   (D) capping said leading and trailing ends
      (a) while insulating the ends of the nondefective pairs, and
      (b) electrically exposing the ends of said defective pair outside the cap, said pair thereby being available for grounding.

3. The method of cutting a length from a multipair, shielded communication cable having a leading and a trailing end and at least one defective pair, comprising the steps of:
   (A) testing the individual pairs of said cable thereby locating said defective pair,
   (B) grounding at least one conductor of said defective pair to the cable shield at both said leading and said trailing ends, while maintaining the nondefective pairs insulated from said shield,
   (C) cutting off a desired length of said cable, and leaving a remaining length,
   (D) belling the conductors of the cut lengths to said shield to locate said defective pair in both lengths of said cut cable,
   (E) grounding at least one conductor of said defective pair in said remaining length to said cable shield, and
   (F) identifying said defective pair in said desired length of said cable.

4. The method of cutting a length from a multipair communication cable having a leading and a trailing end and at least one defective pair, comprising the steps of:
   (A) testing the individual pairs of said cable thereby locating said defective pair,
   (B) identifying said defective pair at said leading and trailing ends,
   (C) capping said leading and trailing ends
      (a) while insulating the ends of the nondefective pairs, and
      (b) electrically exposing both ends of said defective pair to ground,
   (D) cutting off a desired length of said cable and leaving a remaining length,
   (E) belling the conductors of said remaining length to said exposed defective pair at said leading end, (a) thereby locating said defective pair, and
(b) identifying the cut end of said defective pair on said remaining length, and (F) belling the conductors of said desired length of said cable to said exposed defective pair at said trailing end,
(a) thereby locating said defective pair, and
(b) identifying the cut end of said defective pair on said desired length.

5. The method of cutting a length from a multipair communication cable having a leading and a trailing end and at least one defective pair, comprising the steps of:
(A) testing the individual pairs of said cable thereby locating said defective pair,
(B) identifying said defective pair at said leading and trailing ends,
(C) capping said leading and trailing ends
(a) while insulating the ends of the nondefective pairs, and
(b) electrically exposing both ends of said defective pair to ground,
(D) cutting off a desired length of said cable and leaving a remaining length,
(E) belling the conductors of said remaining length to said exposed defective pair at said leading end,
(a) thereby locating said defective pair, and
(b) identifying the cut end of said defective pair on said remaining length,
(F) belling the conductors of said desired length of said cable to said exposed defective pair at said trailing end,
(a) thereby locating said defective pair, and
(b) identifying the cut end of said defective pair on said desired length, and
(G) capping the cut end of said remaining length
(a) while insulating the ends of the nondefective pairs, and
(b) electrically exposing the ends of said defective pair to ground.

6. The method of reeling a multipair, shielded communication cable having a leading and a trailing end and at least two coded defective pairs, comprising the steps of:
(A) winding said cable onto a reel while maintaining said leading end accessible for testing and capping,
(B) testing the individual pairs of said cable,
(C) grounding the tip conductor of one of said defective pairs to the cable shield,
(D) grounding the ring conductor of the other of said defective pairs to said cable shield,
(E) maintaining the nondefective pairs and ungrounded conductors of said defective pairs insulated from said shield, and
(F) capping said leading and trailing ends.

7. The method of cutting a length from a multipair, shielded communication cable having a leading and a trailing end and at least two defective pairs comprising the steps of:
(A) testing the individual pairs of said cable,
(B) grounding both ends of the tip conductor of one of said defective pairs to the cable shield,
(C) grounding both ends of the ring conductor of the other of said defective pairs to said cable shield,
(D) maintaining the nondefective pairs and the ungrounded conductors of said defective pairs insulated from said shield,
(E) cutting a desired length from said cable,
(F) belling the conductors of the cut lengths to said shield to locate the defective pairs, and
(G) in each of the cut lengths identifying the pair in which the tip conductor is grounded as distinct from the pair in which the ring conductor is grounded.

8. The method of reeling a multipair, shielded communication cable having a leading and a trailing end and at least two defective pairs, comprising the steps of:
(A) winding said cable onto a reel while maintaining said leading end accessible for testing and capping,
(B) testing the individual pairs of said cable,
(C) grounding at least one conductor of one of said defective pairs to the cable shield in series with an electrical resistor,
(D) grounding at least one conductor of the other of said defective pairs to said shield,
(E) maintaining the nondefective pairs insulated from said shield, and
(F) capping said leading and trailing ends.

9. The method of cutting a length from a multipair, shielded telephone cable having a leading and a trailing end and at least two defective pairs comprising the steps of:
(A) testing the individual pairs of said cable, and locating said defective pairs,
(B) grounding both ends of at least one conductor of one of said defective pairs to the cable shield in series with an electrical resistor,
(C) grounding both ends of at least one conductor of the other of said defective pairs to said shield,
(D) maintaining the nondefective pairs insulated from said shield,
(E) cutting a desired length from said cable,
(F) belling the conductors of the cut lengths to said shield by means responsive to the difference in the resistance of said conductors, and
(G) in each of the cut lengths identifying said defective pairs in accordance with the difference in the resistances of the circuits formed therewith.

10. The method of reeling a multipair, shielded communication cable having a leading and a trailing end and at least one defective pair, comprising the steps of:
(A) winding said cable onto a reel while maintaining said leading end accessible for testing and capping,
(B) testing the individual pairs of said cable thereby locating said defective pair, and
(C) covering the ends of said cable with metallic caps
(a) at least one conductor of said defective pair being grounded to said cap, and
(b) the nondefective pairs being insulated from said cap.

11. The method of cutting a length from a multipair communication cable having a leading and a trailing end and at least one defective pair, comprising the steps of:
(A) testing the individual pairs of said cable thereby locating said defective pair,
(B) applying metal sealing caps to the ends of said cable,
(a) at least one conductor of said defective pair being grounded to said caps, and
(b) the nondefective pairs being insulated from said caps,
(C) cutting off a desired length of said cable and leaving a remaining length,
(D) belling the conductors of the cut lengths to said caps to locate said defective pair in both lengths of said cut cable,
(E) applying a sealing cap to the exposed end of said remaining length,
(a) at least one conductor of said defective pair being grounded to said cap on said exposed end, and
(b) the nondefective pairs being insulated from said cap on said exposed end.

12. The method of reeling a multipair communication cable having a leading and a trailing end and at least two coded defective pairs, comprising the steps of:
(A) winding said cable onto a reel while maintaining said leading end accessible for testing and capping,
(B) applying metal caps to the ends of said cable while (a) grounding the tip conductor of one of said defective pairs to said caps,
(b) grounding the ring conductor of the other of said defective pairs to said caps, and
(c) maintaining the nondefective pairs and ungrounded conductors of said defective pairs insulated from said caps.

13. The method of cutting a length from a multipair communication cable having a leading and a trailing end and at least two defective pairs comprising the steps of:
(A) testing the pairs of said cable,
(B) applying metal caps to the ends of said cable while
   (a) grounding the tip conductor of one of said defective pairs to said caps,
   (b) grounding the ring conductor of the other of said defective pairs to said caps, and
   (c) maintaining the nondefective pairs and the ungrounded conductors of said defective pairs insulated from said caps,
(C) cutting a desired length from said cable,
(D) belling the cut lengths to said caps to locate the defective pairs, and
(E) in each of the cut lengths identifying the pair in which the tip conductor is grounded as distinct from the pair in which the ring conductor is grounded.

14. The method of reeling a multipair communication cable having a leading and a trailing end and at least two defective pairs, comprising the steps of:
(A) winding said cable onto a reel while maintaining said leading end accessible for testing and capping,
(B) testing the individual pairs of said cable thereby locating said defective pairs,
(C) applying metal caps to the ends of said cable while
   (a) grounding at least one conductor of one of said defective pairs to said caps in series with an electrical resistor,
   (b) grounding at least one conductor of the other of said defective pairs to said caps, and
   (c) maintaining the nondefective pairs insulated from said caps.

References Cited by the Examiner

UNITED STATES PATENTS 3,054,949  9/1962  Bates et al. _____ 324—66

FOREIGN PATENTS 270,136  7/1913  Germany.
924,432  4/1963  Great Britain.

WALTER L. CARLSON, *Primary Examiner.*

G. R. STRECKER, *Assistant Examiner.*